United States Patent

Moran

[11] 3,967,502
[45] July 6, 1976

[54] THERMO TIMER
[76] Inventor: John D. Moran, 1014 W. 15th St., Hazelton, Pa. 18201
[22] Filed: Sept. 6, 1974
[21] Appl. No.: 503,656

[52] U.S. Cl. ............................. 73/352; 99/343
[51] Int. Cl.² ............................................. G01K 1/16
[58] Field of Search ............... 73/343 R, 352, 377, 73/362 AR, 368.3, 374; 99/327, 343, 342; 58/1 R; 116/1; 206/306

[56] References Cited
UNITED STATES PATENTS

| | | | |
|---|---|---|---|
| 339,176 | 4/1886 | Hempel | 73/352 |
| 738,960 | 9/1903 | Vaughan et al | 206/306 |
| 797,371 | 8/1905 | Raubold | 73/343 R |
| 1,729,298 | 9/1929 | Stewart | 73/374 |
| 2,276,178 | 3/1942 | Ford | 73/352 |
| 2,430,290 | 11/1947 | Hann | 73/374 X |
| 3,500,280 | 3/1970 | Ensign | 73/362 AR X |
| 3,673,868 | 7/1972 | Beury | 73/362 AR |
| 3,756,083 | 9/1973 | Tatsutomi | 73/368.3 |
| 3,830,191 | 8/1974 | Burke | 73/352 X |

Primary Examiner—Richard C. Queisser
Assistant Examiner—Daniel M. Yasich
Attorney, Agent, or Firm—David A. Tamburro

[57] ABSTRACT

A thermal timing device formed by a meat thermometer provided with a removable heat insulating shroud or jacket. The meat thermometer may be used in the usual fashion without the jacket to indicate the extent to which meat is roasted. With the jacket in place on the thermometer, the timing device may then be used for controlling other cooking processes such as broiling, baking, deep fat frying, and boiling.

7 Claims, 6 Drawing Figures

THERMO TIMER

BACKGROUND AND SUMMARY OF THE INVENTION

This invention relates generally to heat measuring instruments and more particularly to a novel thermo timing device capable of controlling various types of cooking processes by automatically compensating for variations in temperature and time of cooking.

Meat thermometers are very commonly used to indicate the extent to which meat has been roasted in an oven. The ordinary meat thermometer, such as the popular Cooper thermometer, comprises a heat conductive, temperature sensing probe which is insertable into the meat roast. A bimetallic coil is thermally connected to the probe and converts heat energy to mechanical movement which is transmitted to a pointer located on the face of a temperature graduated dial. When the pointer rotates adjacent to a predetermined temperature graduation, usually limited to about 200°F, the desired extent of roasting is obtained and cooking is complete.

This type of meat thermometer has been used very extensively and successfully and is a common tool in most households. However, it is limited primarily to roasting meats because of the rapid rate of response of the sensing probe to surrounding temperature conditions. Consequently, it has not been useful for controlling such cooking operations as baking, boiling, and deep frying. These type of operations usually are regulated by actually timing the period of cooking at a particular temperature for the food materials.

Accordingly, the primary object of the invention resides in the provision of a novel thermo timing device which may be used for regulating and indicating by way of either a temperature reading or time reading the extent of cooking of a particular food product.

Another object of the invention resides in the provision of a novel thermo timing device comprising a conventional meat thermometer and a removable heat insulating shroud or jacket which adapts the meat thermometer for usage in controlling and indicating the extent to which other foods are cooked by processes other than roasting. The heat insulating jacket interposes a substantial time delay factor between the heat sensing probe of the thermometer and the temperature of the cooking medium, such as boiling water, oven air, or frying fat. In accordance with predetermined calculatable values, specific temperature or time readings on the indicator dial will indicate the extent to which particular foods are cooked. Any variations between temperature and time, the parametes which basically control the cooking process, are compensated for automatically.

Other objects and advantages of the invention will become apparent from reading the following detailed description of the invention wherein reference is made to the accompanying drawings throughout which like numerals indicate like elements.

DETAILED DESCRIPTION OF THE INVENTION

Figure 1:
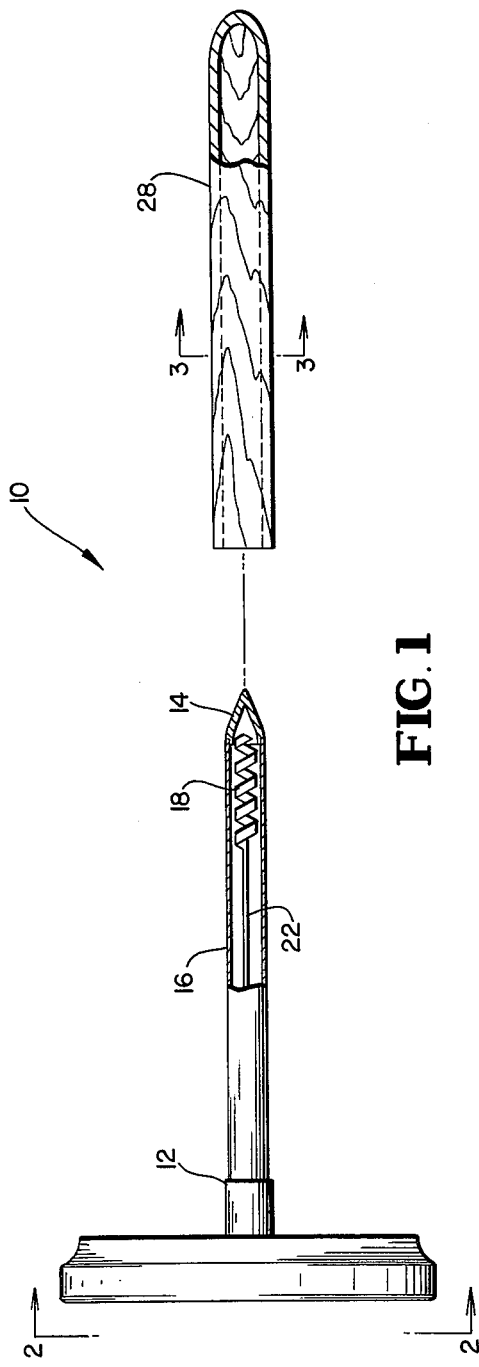
FIG. 1 is a fragmentary, partially sectioned view of a thermal timer constructed according to the invention.
Figure 2:
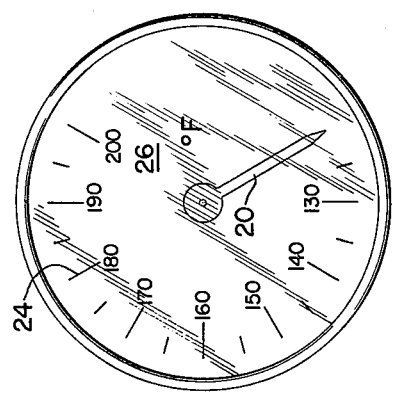
FIG. 2 is a view taken along line 2—2 of FIG. 1.
Figure 3:
FIG. 3 is a section view taken along line 3—3 of FIG. 1.
Figure 4:
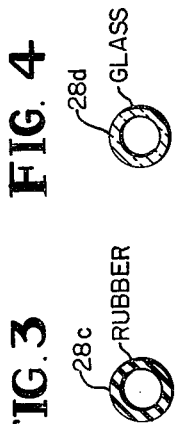
FIG. 4 is a section similar to FIG. 3, but showing a jacket constructed of plastic.
Figure 5:
FIG. 5 is a section similar to FIG. 3, but showing a jacket constructed of rubber.
Figure 6:
FIG. 6 is a section similar to FIG. 3, but showing a jacket constructed of glass.

Referring to the drawings, the thermal timer device 10 comprises a conventional meat thermometer 12 having a conical temperature sensing heat conductive metal probe 14 mounted on the end of metal casing 16. A bimetal coil 18 is connected to probe 14 and converts heat energy to rotary mechanical movement which is transmitted to a rotatable pointer 20 by way of a rod 22. In standard fashion, probe 14 is inserted into the meat to be roasted and, as coil 18 heats up, pointer 20 is rotated clockwise adjacent the various temperature graduations 24 on dial face 26. When the pointer has been displaced to a predetermined temperature graduation on face 26 corresponding to the desired extent of roasting of the meat, the cooking process is complete.

In order to adapt the conventional meat thermometer 12 to other cooking processes and convert it to a more universal cooking instrument, a heat insulating shroud or jacket 28 is provided for removable mounting on casing 16 to insulate probe 14 from the surrounding cooking medium. Jacket 28 may be constructed of any suitable material such as wood, plastic (28b), rubber (28c), glass (28d), provided the material has sufficient heat insulating characteristics and the jacket is of sufficient thickness to interpose the desired thermal delay between the cooking medium and probe 14. For example, in a prototype constructed according to the invention, jacket 28 was made from pine wood and timer 10 worked very effectively in tests which ran for thirty minutes in boiling water and thirty minutes in a oven at 450°F.

Thus, insulator jacket 28 beneficially converts the standard meat thermometer 12 to a universal thermal timer for cooking purposes. With jacket 28 off, thermometer 12 is used as a standard meat thermometer. With the jacket on it becomes a more versatile timer. For example, to make soft boiled eggs, probe 14 covered by jacket 28 is placed into the water with the eggs. When the predetermined proper temperature is indicated on dial 26, the eggs will be done. The need for actually timing the boiling period is alleviated.

The timer operates according to the formula for thermal conduction, $$Q = \frac{KA(T_h - T_c) \text{Time}}{D}$$

where Q is amount of heat transfer required for the cooking process, K is the coefficient of heat transfer, A is area, D is the distance of heat transfer, $T_h$ is the temperature of the cooking medium (e.g. boiling water) and $T_c$ is room temperature. The only variables in the cooking process are $T_h$ and time and these are inversely related. The thermo timer 10 automatically compensates for variations in $T_h$ (temperature of the medium), i.e. it increases cooking time for lower temperatures $T_h$ and decreases the time for higher temperatures, thus affording constant cooking results. In addition to temperature graduations 24, dial 26 may be provided with predetermined related time graduations so that a direct time reading may be made from the dial. This would for example facilitate the cooking of foods according to specific time instructions noted on packages by manufacturers.

It may be desirable to furnish a plurality of jackets 28, each having a different rate of thermal conductivity. For example, one jacket may be used for boiling foods, another for baking in an oven, another for deep frying, etc. The rate of thermal conductivity may be varied by the material used or by the thickness of the jacket. In each case, however, the jacket will function to substantially delay the response of probe 14 to the temperature of the cooking medium, and according to predeterminable calculations will furnish a temperature or time reading on dial 26 indicative of completion of a particular food cooking process.

From the description hereinabove, it is apparent that the thermo timer device of the invention extends the usefulness of the standard meat thermometer, and enables additional food cooking processes to be regulated automatically according to a direct temperature or time dial indication.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A thermal measuring device for measuring the heating time of a substance comprising a metallic heat conducting probe insertable into said substance to sense the temperature of said substance, indicating means responsive to said heat conducting probe for indicating the heat content of the substance sensed, and close fitting removable heat insulating jacket means having a shape complimentary to the probe and slidably mountable over said probe to substantially delay the response of said probe to the temperature of said substance for selective use on the probe.

2. The thermal measuring device according to claim 1, said insulating means comprising a plurality of jackets each having different rates of heat transfer.

3. The thermal measuring device according to claim 1, wherein said metallic probe has a conical piercing end rendering it useful as a meat roasting thermometer and said insulating means adapts said thermometer for universal usage to other cooking processes.

4. The thermal measuring device according to claim 1, wherein said insulating means is constructed of wood.

5. The thermal measuring device according to claim 1, wherein said insulating means is constructed of plastic.

6. The thermal measuring device according to claim 1, wherein said insulating means is constructed of glass.

7. The thermal measuring device according to claim 1, wherein said insulating means is constructed of a material selected from a group consisting of wood, plastic, glass, and rubber, or combinations thereof.

* * * * *